(12) United States Patent
Motoda

(10) Patent No.: US 11,047,256 B2
(45) Date of Patent: Jun. 29, 2021

(54) VARIABLE NOZZLE UNIT AND TURBOCHARGER

(71) Applicant: IHI Corporation, Koto-ku (JP)

(72) Inventor: Natsuko Motoda, Koto-ku (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/348,634

(22) PCT Filed: Nov. 6, 2017

(86) PCT No.: PCT/JP2017/039954
§ 371 (c)(1),
(2) Date: May 9, 2019

(87) PCT Pub. No.: WO2018/088363
PCT Pub. Date: May 17, 2018

(65) Prior Publication Data
US 2019/0264575 A1 Aug. 29, 2019

(30) Foreign Application Priority Data
Nov. 10, 2016 (JP) .............. JP2016-219724

(51) Int. Cl.
F01D 17/16 (2006.01)
F02B 37/24 (2006.01)
F02B 39/00 (2006.01)

(52) U.S. Cl.
CPC .......... F01D 17/165 (2013.01); F01D 17/16 (2013.01); F02B 37/24 (2013.01); F02B 39/00 (2013.01);
(Continued)

(58) Field of Classification Search
None
See application file for complete search history.

(56) References Cited

U.S. PATENT DOCUMENTS 5,178,516 A * 1/1993 Nakagawa ............ F04D 29/444
415/208.3
6,314,736 B1 * 11/2001 Daudel .................. F01D 11/00
415/148
(Continued)

FOREIGN PATENT DOCUMENTS

CN 101341313 A 1/2009
CN 102203396 A 9/2011
(Continued)

OTHER PUBLICATIONS

International Search Report dated Jan. 23, 2018 in PCT/JP2017/039954 filed on Nov. 6, 2017.

Primary Examiner — Ninh H. Nguyen
Assistant Examiner — Jason Fountain
(74) Attorney, Agent, or Firm — Oblon, McClelland, Maier & Neustadt, L.L.P.

(57) ABSTRACT

A variable nozzle unit includes a variable nozzle vane which is disposed between a hub wall surface and a shroud wall surface and is rotatable around a rotation axis parallel to a rotation axis of a turbine impeller inside a gas flow passage. The variable nozzle vane includes a leading edge, a trailing edge, and an outer vane surface connecting the leading edge and the trailing edge and facing a radial outside of the rotation axis. A concave portion at least in a range of a leading edge side in relation to the rotation axis is formed at the hub wall surface side of the outer vane surface.

13 Claims, 8 Drawing Sheets

(52) U.S. Cl.
    CPC .... *F05D 2220/40* (2013.01); *F05D 2250/712* (2013.01); *Y02T 10/12* (2013.01)

(56) References Cited

U.S. PATENT DOCUMENTS

| | | | |
|---|---|---|---|
| 7,255,530 | B2 | 8/2007 | Vogiatzis et al. |
| 9,932,888 | B2* | 4/2018 | Wallace .................. F01D 25/16 |
| 10,072,513 | B2* | 9/2018 | Osako ................... F01D 17/165 |
| 2010/0098529 | A1 | 4/2010 | Roby et al. |
| 2011/0097205 | A1 | 4/2011 | Maddaus |
| 2011/0206500 | A1 | 8/2011 | Nagao et al. |
| 2011/0314808 | A1 | 12/2011 | Mohamed et al. |
| 2013/0017061 | A1 | 1/2013 | Roby et al. |
| 2014/0112764 | A1 | 4/2014 | Morita |
| 2014/0341729 | A1 | 11/2014 | Osako et al. |

FOREIGN PATENT DOCUMENTS

| | | |
|---|---|---|
| CN | 103946487 A | 7/2014 |
| CN | 104136736 A | 11/2014 |
| CN | 105143635 A | 12/2015 |
| JP | 2010-216283 A | 9/2010 |
| JP | 2011-94616 A | 5/2011 |
| JP | 2013-137017 A | 7/2013 |
| JP | 2014-156809 A | 8/2014 |
| JP | 2015-14252 A | 1/2015 |
| JP | 2015-194092 A | 11/2015 |
| WO | WO 2008/101105 A2 | 8/2008 |
| WO | WO 2010/052911 A1 | 5/2010 |
| WO | WO 2012/161280 A1 | 11/2012 |

\* cited by examiner

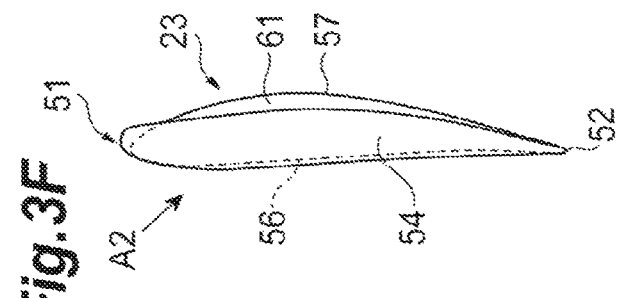
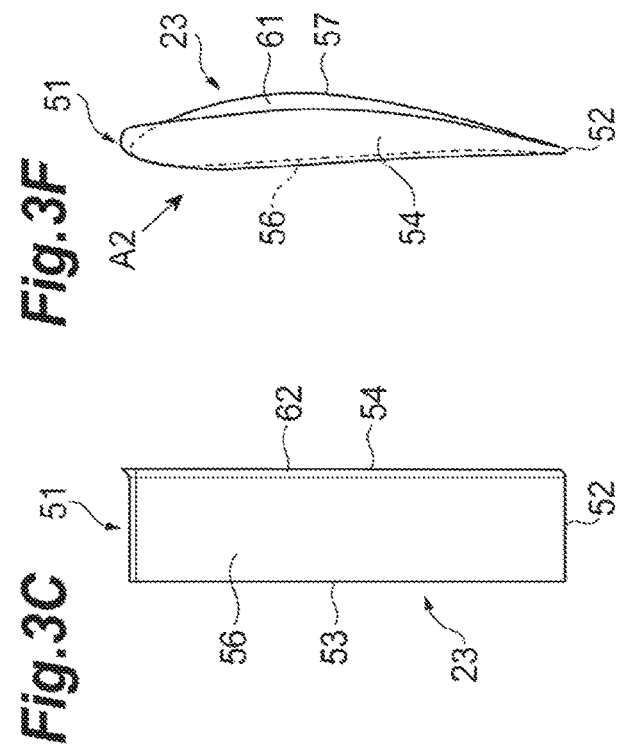
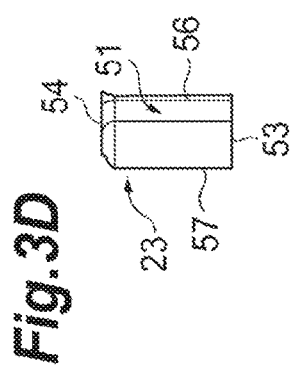
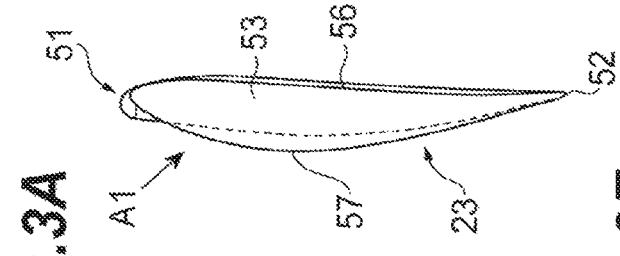
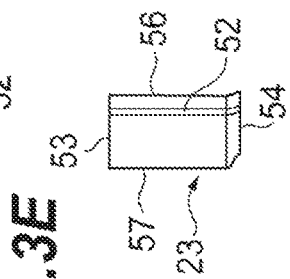
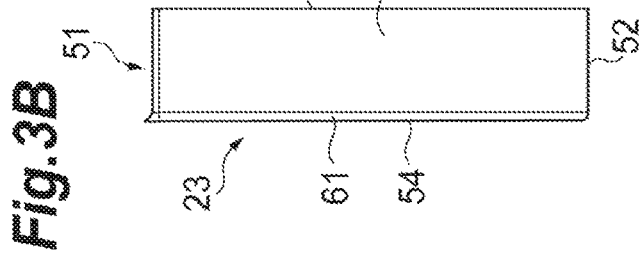

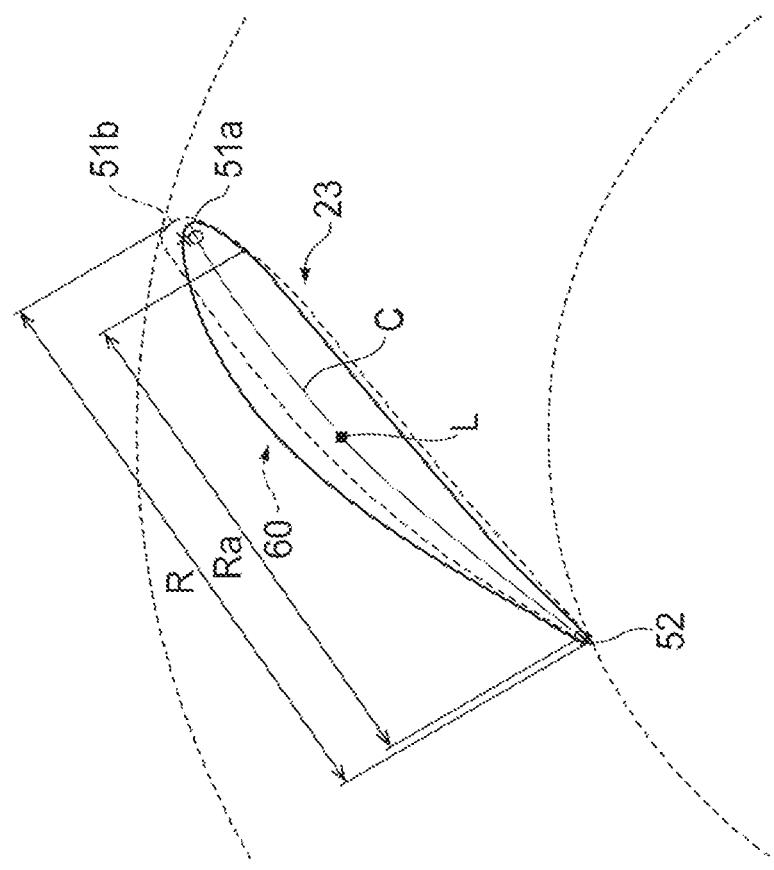
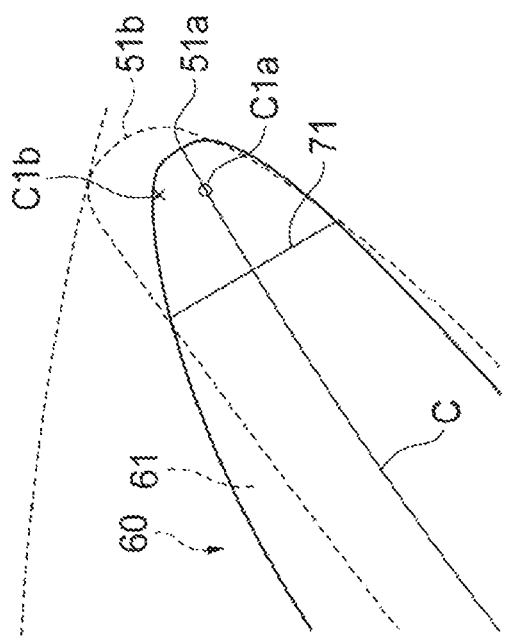
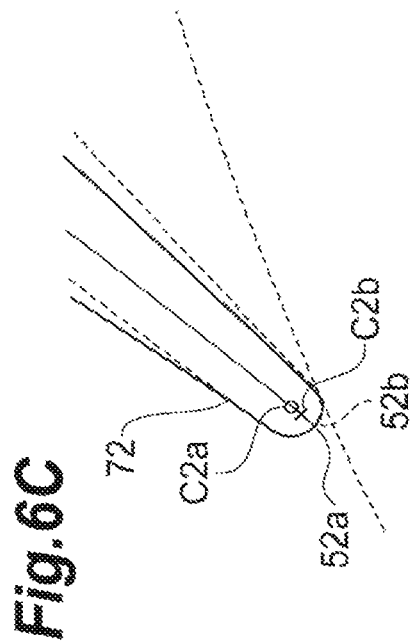

VARIABLE NOZZLE UNIT AND TURBOCHARGER

TECHNICAL FIELD

The present disclosure relates to a variable nozzle unit and a turbocharger.

BACKGROUND ART

Conventionally, as described in Patent Literature 1, a nozzle vane (variable nozzle vane) for changing a flow passage area of a gas flowing into a turbine impeller is known. The nozzle vane is rotatable about an axis parallel to a rotation axis of the turbine impeller. By the rotation of the nozzle vane, the flow passage area of the gas can be changed. The nozzle vane described in Patent Literature 1 includes a hub end surface and a shroud end surface which define a height, includes a leading edge and a trailing edge which define a length, and includes an inner surface and an outer surface which define a thickness. Then, the length and the thickness in at least a part of the nozzle vane are changed in response to the height.

CITATION LIST

Patent Literature

Patent Literature 1: U.S. Pat. No. 7,255,530

SUMMARY OF INVENTION

Technical Problem

The inventors of the present disclosure have found that turbine efficiency is improved by decreasing a clearance flow at a shroud side in the variable nozzle vane. For that reason, they have examined a technique of moving the variable nozzle vane closer to a shroud side. Meanwhile, when the variable nozzle vane is moved closer to the shroud side, a clearance is formed at a hub side. Conventionally, a technique of improving performance of a turbine by increasing a chord length at the hub side and decreasing a clearance flow at the hub side is also known. However, it is difficult to decrease the hub side clearance flow in fact. Then, when the huh side clearance flow increases, the flow along the main flow decreases.

The present disclosure will describe a variable nozzle unit and a turbocharger capable of increasing the flow of the main flow by relatively decreasing the hub side clearance flow.

Solution to Problem

According to an aspect of the present disclosure, there is provided a variable nozzle unit used in a turbine including a gas flow passage through which a gas flowing from a scroll flow passage to a turbine impeller passes and a hub wall surface and a shroud wall surface which face each other in a direction of a rotation axis of the turbine impeller and form the gas flow passage, including: a variable nozzle vane which is disposed between the hub wall surface and the shroud wall surface and is rotatable about a rotation axis parallel to the rotation axis of the turbine impeller inside the gas flow passage, in which the variable nozzle vane includes a leading edge, a trailing edge, and an outer vane surface connecting the leading edge and the trailing edge and facing a radial outside of the rotation axis, and in which a concave portion at least in a range of the leading edge side in relation to the rotation axis is formed at the hub wall surface side of the outer vane surface.

Effects of Invention

According to an aspect of the present disclosure, since it is possible to relatively decrease the hub side clearance flow, it is possible to increase the flow of the main flow.

BRIEF DESCRIPTION OF DRAWINGS

FIGS. 3A to 3F are six plane views of a variable nozzle vane.

FIG. 6A is a front view illustrating a three-dimensional shape of the variable nozzle vane, FIG. 6B is a partially enlarged view of FIG. 6A in the vicinity of the leading edge, and FIG. 6C is a partially enlarged view of FIG. 6A in the vicinity of the trailing edge.

DESCRIPTION OF EMBODIMENTS

Figure 1:
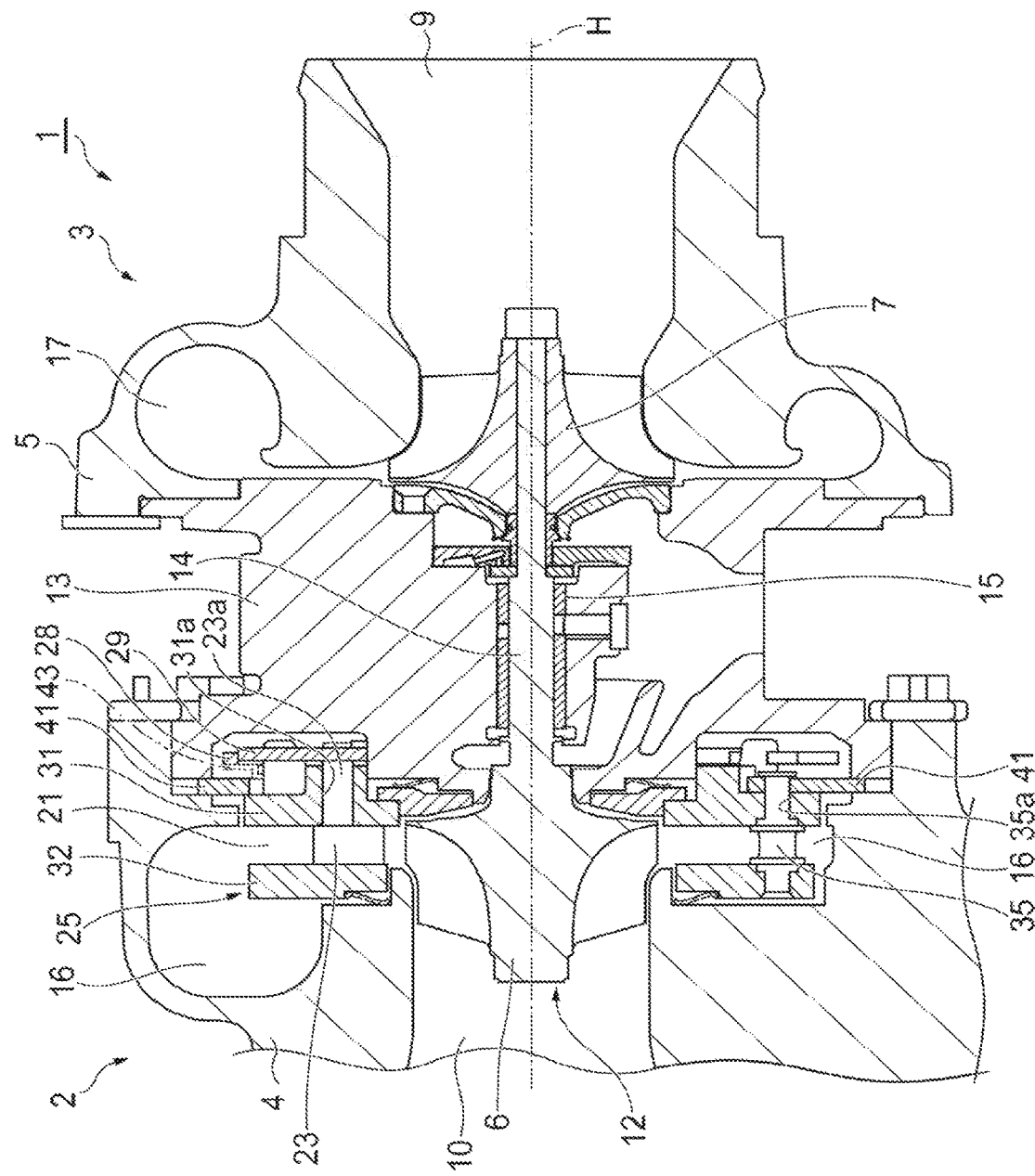
FIG. 1 is a cross-sectional view of a turbocharger according to an embodiment of the present disclosure.

According to an aspect of the present disclosure, there is provided a variable nozzle unit used in a turbine including a gas flow passage through which a gas flowing from a scroll flow passage to a turbine impeller passes and a hub wall surface and a shroud wall surface which face each other in a direction of a rotation axis of the turbine impeller and form the gas flow passage, including: a variable nozzle vane which is disposed between the hub wall surface and the shroud wall surface and is rotatable about a rotation axis parallel to the rotation axis of the turbine impeller inside the gas flow passage, in which the variable nozzle vane includes a leading edge, a trailing edge, and an outer vane surface connecting the leading edge and the trailing edge and facing a radial outside of the rotation axis, and in which a concave portion at least in a range of the leading edge side in relation to the rotation axis is formed at the hub wall surface side of the outer vane surface.

In the variable nozzle unit, the concave portion is formed at the hub wall surface side of the outer vane surface. In general, a high pressure is formed at the radial outside of the leading edge side of the variable nozzle vane and a low pressure is formed at the radial inside of the variable nozzle vane. In this way, a difference in pressure is generated between the outside and the inside. Since the concave portion is provided in the range of the leading edge side, a pressure in the vicinity of the outer concave portion can be decreased. Accordingly, a difference in pressure between the outside and the inside decreases. Thus, it is possible to relatively decrease the hub side clearance flow. Since the clearance flow decreases, the flow along the main flow can be increased.

In some aspects, the concave portion is formed in a range of 80% or more of the entire length of the variable nozzle vane defined by the leading edge and the trailing edge. In this way, since the concave portion is provided in most of the entire length, it is possible to decrease a difference in pressure between the outside and the inside in the wider range of the variable nozzle vane. Thus, the clearance flow can be further decreased.

In some aspects, the variable nozzle vane includes a hub end surface facing the hub wall surface and a shroud end surface facing the shroud wall surface, and the outer vane surface includes: a stationary portion which is formed in a first range at the shroud end surface side of the entire height of the variable nozzle vane defined by the hub end surface and the shroud end surface and has a stationary cross-section perpendicular to the rotation axis and an inclined surface portion which is formed in a second range at the hub end surface side of the entire height while being continuous to the stationary portion through a boundary line and forms the concave portion extending linearly between the boundary line and the hub end surface. A low pressure portion can be reliably formed by the inclined surface portion extending linearly from the boundary line with respect to the stationary portion to the hub end surface.

In some aspects, the second range is a range of 15% or less of the entire height. When the concave portion is provided in a too wide range of the entire height, the function of the outer vane surface may be damaged. When the second range is 15% or less of the entire height, it is possible to prevent the function of adjusting the flow passage area of the main flow due to the outer vane surface from being impaired, while decreasing the clearance flow as described above.

According to a turbocharger including any one of the variable nozzle units provided in the turbine, it is possible to obtain the turbine performance improvement effect.

Hereinafter, an embodiment of a variable displacement type turbocharger of the present disclosure will be described with reference to the drawings. Furthermore, in the drawings, since the features of constituent elements may be exaggeratedly depicted, a dimensional ratio of each part in the drawings does not necessarily match a real one.

A variable displacement type turbocharger 1 illustrated in FIG. 1 is applied to, for example, an internal combustion engine of a ship or a vehicle. As illustrated in FIG. 1, the variable displacement type turbocharger 1 includes a turbine 2 and a compressor 3. The turbine 2 includes a turbine housing 4 and a turbine impeller 6 accommodated in the turbine housing 4. The turbine housing 4 includes a scroll flow passage 16 which extends in the circumferential direction around the turbine impeller 6. The compressor 3 includes a compressor housing 5 and a compressor impeller 7 accommodated in the compressor housing 5. The compressor housing 5 includes a scroll flow passage 17 which extends in the circumferential direction around the compressor impeller 7.

The turbine impeller 6 is provided at one end of a rotary shaft 14. The compressor impeller 7 is provided at the other end of the rotary shaft 14. A bearing housing 13 is provided between the turbine housing 4 and the compressor housing 5. The rotary shaft 14 is rotatably supported by the bearing housing 13 through the bearing 15 and the rotary shaft 14, the turbine impeller 6, and the compressor impeller 7 rotate about a rotation axis H as an integrated rotation body 12.

The turbine housing 4 is provided with an exhaust gas inlet (not illustrated) and an exhaust gas outlet 10. An exhaust gas which is discharged from an internal combustion engine (not illustrated) flows into the turbine housing 4 through the exhaust gas inlet and flows into the turbine impeller 6 through the scroll flow passage 16 to rotate the turbine impeller 6. Then, the exhaust gas is discharged to the outside of the turbine housing 4 through the exhaust gas outlet 10.

The compressor housing 5 is provided with a suction port 9 and a discharge port (not illustrated). When the turbine impeller 6 rotates as described above, the compressor impeller 7 rotates through the rotary shaft 14. The rotating compressor impeller 7 sucks external air through the suction port 9, compresses the air, and discharges the compressed air from the discharge port through the scroll flow passage 17. The compressed air which is discharged from the discharge port is supplied to the above-described internal combustion engine.

Next, the turbine 2 will be described in more detail. The turbine 2 is a variable displacement type turbine and a plurality of variable nozzle vanes 23 are provided in a gas flow passage 21 connecting the scroll flow passage 16 and the turbine impeller 6. The plurality of variable nozzle vanes 23 are arranged in the circumferential direction around the rotation axis H and each variable nozzle vane 23 rotates about a rotation axis L (see FIG. 6A) parallel to the rotation axis H. The gas flow passage 21 causes a gas flowing from the scroll flow passage 16 to the turbine impeller 6 to flow therethrough. When the variable nozzle vane 23 rotates as described above, the cross-sectional area (the throat area) of the gas flow passage is optimally adjusted in response to the flow amount of the exhaust gas flowing into the turbine 2.

As described above, the turbine 2 includes a variable nozzle unit 25 as a drive mechanism for rotating the variable nozzle vane 23. the variable nozzle unit 25 is fitted into the turbine housing 4 and is fixed, for example, between the turbine housing 4 and the bearing housing 13.

Hereinafter, the variable nozzle unit 25 which is applied to the turbine 2 of the variable displacement type turbocharger 1 will be described with reference to FIGS. 1 and 2. In the description below, the "axial direction", the "radial direction", and the "circumferential direction" simply and respectively mean the direction of the rotation axis H, the rotational radial direction, and the rotational circumferential direction of the turbine impeller 6. Further, in the direction of the rotation axis H, a side close to the turbine 2 will be simply referred to as a "turbine side" and a side close to the compressor 3 will be simply referred to as a "compressor side".

The variable nozzle unit 25 includes the plurality of (in the example illustrated in the drawings, eleven) variable nozzle vanes 23 along with a first nozzle ring 31 and a second nozzle ring 32 which sandwich the variable nozzle vanes 23 in the axial direction. Each of the first nozzle ring 31 and the second nozzle ring 32 is formed in an annular shape about the rotation axis H and is disposed to surround the turbine impeller 6 in the circumferential direction. A region which is located between the first nozzle ring 31 and the second nozzle ring 32 forms the above-described gas flow passage 21. The second nozzle ring 32 faces the scroll flow passage 16 (see FIG. 1) and the second nozzle ring 32 forms a part of the inner wall of the scroll flow passage 16. A rotary shaft 23a of each variable nozzle vane 23 is rotatably inserted through a bearing hole 31a of the first nozzle ring 31 and the first nozzle ring 31 axially supports each variable nozzle vane 23 in a cantilevered manner. Furthermore, in the example illustrated in the drawings, the variable nozzle vanes 23 are arranged at the same interval in the circumferential direction, but the variable nozzle vanes 23 may not essentially be arranged at the same interval. FIG. 2 also illustrates the rotation direction D of the turbine impeller 6.

As illustrated in FIG. 1, an annular plate-shaped support ring 41 is fixed to the compressor side of the first nozzle ring 31 and an annular drive ring support member 43 is fixed to the compressor side of the support ring 41. Each of the first nozzle ring 31, the second nozzle ring 32, the support ring 41, and the drive ring support member 43 is provided with a plurality of (in the example illustrated in the drawings, three) pin holes 35a. When the connection pin 35 is inserted through each pin hole 35a, the first nozzle ring 31, the second nozzle ring 32, the support ring 41, and the drive ring support member 43 are connected.

Furthermore, the support ring 41 and the drive ring support member 43 are caulked to the first nozzle ring 31 by the compressor side portion of the connection pin 35. Further, the turbine side portion of the connection pin 35 is provided with two flange portions for respectively positioning the first nozzle ring 31 and the second nozzle ring 32. Since a dimension between two flange portions is manufactured with high accuracy, the accuracy of the axial dimension of the gas flow passage 21 is secured. When the drive ring 28 is attached to the drive ring support member 43, the drive ring 28 is supported to be rotatable about the rotation axis H. When the outer peripheral portion of the support ring 41 is sandwiched between the turbine housing 4 and the bearing housing 13 in the axial direction, the entire variable nozzle unit 25 is held by the turbine housing 4 and the bearing housing 13.

The drive ring 28 is a member that transmits a driving force input from the outside to the variable nozzle vane 23 and is formed as a single member by, for example, a metal material. The drive ring 28 is formed in an annular shape extending in the circumferential direction around the rotation axis H and rotates about the rotation axis H by a driving force transmitted from the outside. The lever 29 is attached to the rotary shaft 23a of each variable nozzle vane 23 and the levers are arranged at the same interval in the circumferential direction on the inside of the drive ring 28.

In such a variable nozzle unit 25, a portion which is formed by the first nozzle ring 31, the second nozzle ring 32, the support ring 41, and the connection pin 35 is fixed to the turbine housing 4 to axially support the plurality of variable nozzle vanes 23 in a rotatable manner.

Figure 7:
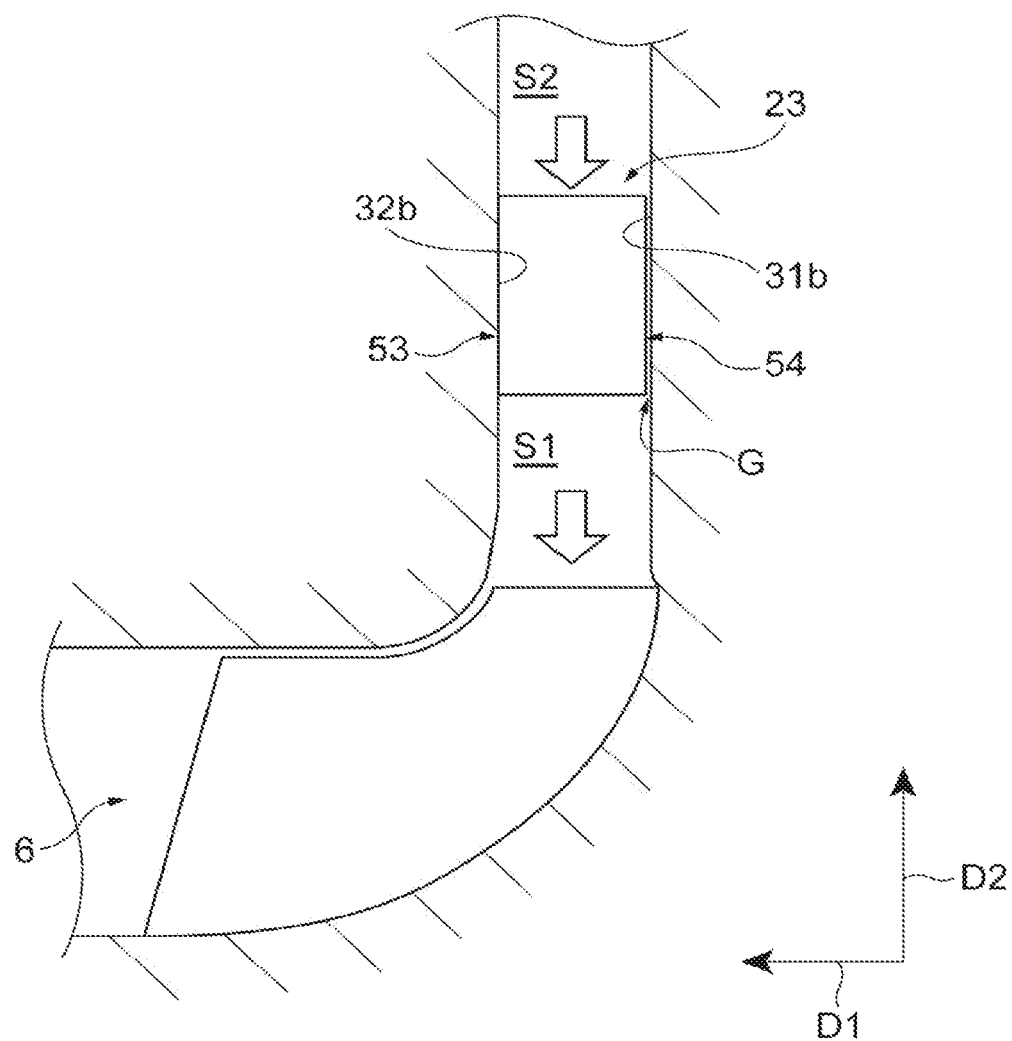
FIG. 7 is a diagram illustrating a shape of the variable nozzle vane in a meridian plane.

Referring to the drawings from FIG. 2, the variable nozzle unit 25 and the variable nozzle vane 23 will be described in more detail. The plurality of variable nozzle vanes 23 are the same and have the same size and shape. A side clearance is formed in order to secure the reliability of the rotation operation of the plurality of variable nozzle vanes 23 disposed between the first nozzle ring 31 and the second nozzle ring 32. That is, as illustrated in FIG. 7, a hub side clearance G can be formed between a hub wall surface 31b of the first nozzle ring 31 and a hub end surface 54 of the variable nozzle vane 23. From the viewpoint of the improvement of the turbine efficiency, the variable nozzle vane 23 is closer to the shroud wall surface 32b during the operation of the variable displacement type turbocharger 1 so that the shroud side clearance does not exist or becomes extremely small.

In the variable nozzle unit 25, since the three-dimensional shape of the variable nozzle vane 23 is devised, a difference in pressure between a radial outside S2 and a radial inside S1 of the variable nozzle unit 25 decreases. Particularly in the vicinity of the leading edge 51 which is located at the side of the hub wall surface 31b of the variable nozzle vane 23 and with which a gas flowing into the variable nozzle unit 25 collides at first, a pressure of the radial outside S2 decreases.

Figure 2:
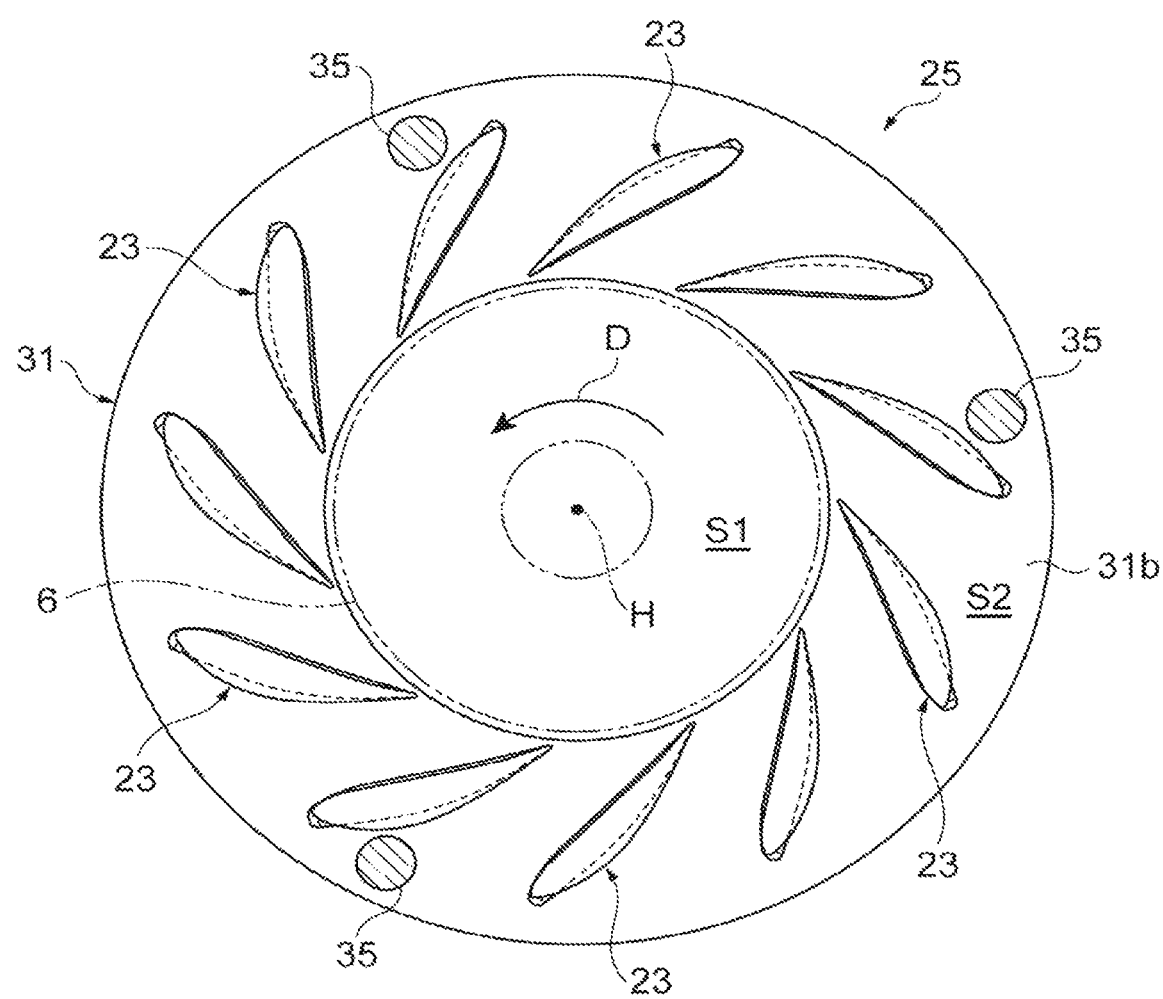
FIG. 2 is a cross-sectional view in which a variable nozzle unit is cut in a plane perpendicular to a rotation axis.

As illustrated in FIGS. 2 and 3, the variable nozzle vane 23 includes a leading edge 51 which is located at the upstream side and a trailing edge 52 which is located at the downstream side with respect to the flow of the gas in the gas flow passage 21. The leading edge 51 and the trailing edge 52 define the length (the entire length) of the variable nozzle vane 23. The variable nozzle vane 23 includes a flat hub end surface 54 which faces the hub wall surface 31b of the first nozzle ring 31 and a flat shroud end surface 53 which faces the shroud wall surface 32b of the second nozzle ring 32. The hub end surface 54 and the shroud end surface 53 connect the leading edge 51 and the trailing edge 52 and are respectively disposed to be orthogonal to the rotation axis H (that is, the rotation axis L). The hub end surface 54 and the shroud end surface 53 define the height (the entire height) of the variable nozzle vane 23. The hub end surface 54 has a size and a shape different from those of the shroud end surface 53. Since a concave portion 60 to be described later is provided, an area of the hub end surface 54 is smaller than that of the shroud end surface 53.

The variable nozzle vane 23 includes an inner vane surface 56 which faces a radial inside S1 and an outer vane surface 57 which faces a radial outside S2. The inner vane surface 56 faces the radial inside S1 and is curved in a concave surface shape. The outer vane surface 57 faces the radial outside S2 and is curved in a convex surface shape. The inner vane surface 56 and the outer vane surface 57 connect the leading edge 51 and the trailing edge 52 and connect the shroud end surface 53 and the hub end surface 54. The inner vane surface 56 and the outer vane surface 57 define the thickness of the variable nozzle vane 23.

Figure 4A:
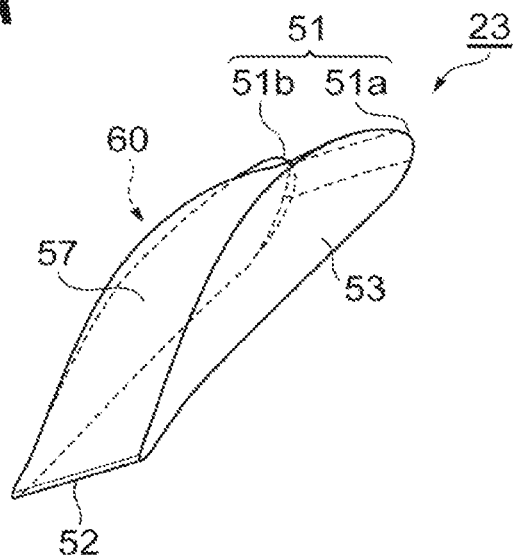
FIG. 4A is a perspective view illustrating the variable nozzle vane when viewed from a direction of an arrow A1 of FIG. 3A
Figure 4B:
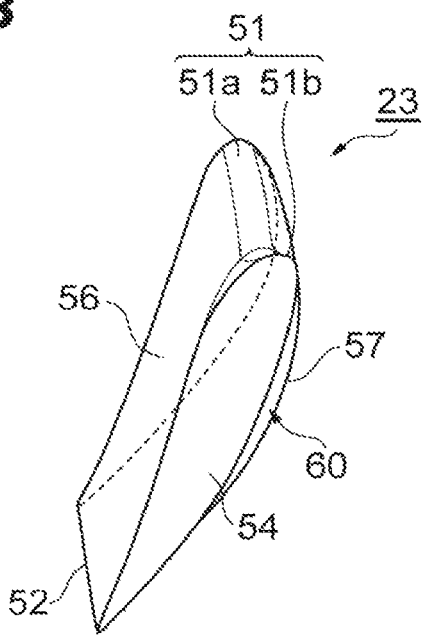
FIG. 4B is a perspective view illustrating the variable nozzle vane when viewed from a direction of an arrow A2 of FIG. 3F.

The three-dimensional shape of the variable nozzle vane 23 will be described in detail. As illustrated in FIGS. 4A and 4B, the concave portion 60 is formed in the outer vane surface 57 of the variable nozzle vane 23 at the side of the hub end surface 54. That is, the concave portion 60 is formed in the outer vane surface 57 at the side of the hub wall surface 31b of the first nozzle ring 31. The concave portion 60 opens to the hub wall surface 31b and communicates with the hub end surface 54. The area of the hub end surface 54 decreases by the amount in which the concave portion 60 is formed. Since the concave portion 60 locally enlarges the space of the gas flow passage, the pressure of the radial outside S2 at the side of the hub wall surface 31b decreases. The concave portion 60 relatively decreases the clearance flow flowing in the hub side clearance G with respect to the main flow.

Figure 5A:
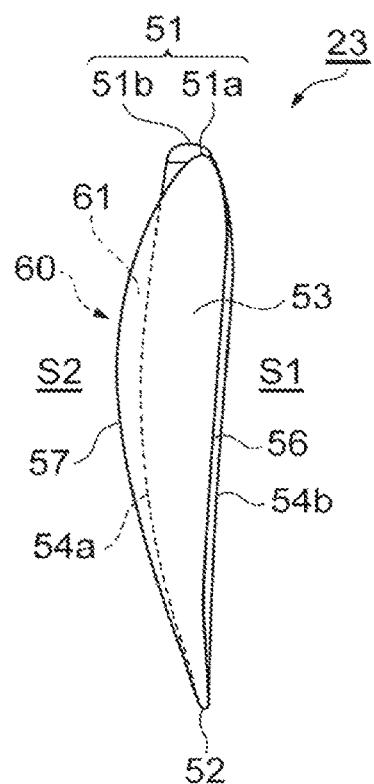
FIG. 5A is a front view illustrating the variable nozzle vane when viewed from a shroud end surface side and FIG. 5B is a diagram illustrating the variable nozzle vane when viewed from a leading edge side.
Figure 5B:
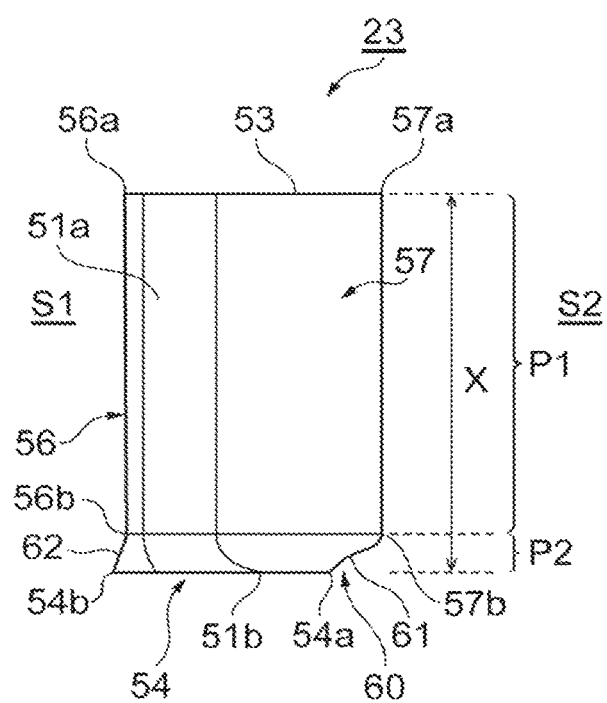

As illustrated in FIG. 5B, the variable nozzle vane 23 includes a stationary portion P1 which is formed in a first range at the side of the shroud wall surface 32b in the entire height X of the variable nozzle vane 23. Hereinafter, a direction parallel to the direction of the rotation axis L will be referred to as a height direction or a span direction. The stationary portion P1 includes the shroud end surface 53. That is, the stationary portion P1 includes an outer shroud ridge portion 57a of the outer vane surface 57 and an inner shroud ridge portion 56a of the inner vane surface 56. In the stationary portion P1, a cross-section perpendicular to the rotation axis L is the same (that is, uniform) in the span direction. A ratio which is occupied by the stationary portion P1 in the entire height X may be 85% or more and 90% or more. That is, the first range may be a range of 85% or more of the entire height X or may be a range of 90% or more of the entire height X.

Meanwhile, the variable nozzle vane 23 includes a hub side portion P2 which is provided at the side (the compressor side) of the hub wall surface 31b of the stationary portion P1 to be continuous to the stationary portion P1. The hub side portion P2 is formed in a second range at the side of the hub wall surface 31b in the entire height X of the variable nozzle vane 23. The hub side portion P2 includes the concave portion 60 and the hub end surface 54. That is, the hub side portion P2 includes an outer hub ridge portion 54a and an inner hub ridge portion 54b of the hub end surface 54. Further, the hub side portion P2 is continuous to the stationary portion P1 through an outer boundary line 57b and an inner boundary line 56b forming the lower end (the hub side end) of the stationary portion P1. Since the outer boundary line 57b and the inner boundary line 56b are a part of the stationary portion P1, the size and the shape thereof are the same as those of the outer shroud ridge portion 57a and the inner shroud ridge portion 56a.

A cross-section perpendicular to the rotation axis L at the hub side portion P2 changes in response to the span direction. The hub side portion P2 includes an inclined surface portion 61 which extends linearly in the span direction between the outer shroud ridge portion 57a and the outer hub ridge portion 54a. The hub side portion P2 includes an inclined surface portion 62 which extends linearly in the span direction between the inner shroud ridge portion 56a and the inner hub ridge portion 54b. The inclined surface portion 61 at the radial outside S2 forms the concave portion 60 which is recessed from the outer vane surface 57. That is, the outer hub ridge portion 54a is disposed at the radial inside S1 in relation to the outer boundary line 57b. Meanwhile, the inclined surface portion 62 at the radial inside S1 protrudes from the inner vane surface 56. That is, the inner hub ridge portion 54b is disposed at the radial inside S1 in relation to the inner boundary line 56b.

A ratio which is occupied by the hub side portion P2 in the entire height X may be 15% or less or 10% or less. That is, the second range may be a range of 15% or less of the entire height X or may be a range of 10% or less of the entire height X. The second range can be appropriately set in consideration of the pressure reduction effect at the radial outside S2 and the function of adjusting the flow passage area of the main flow passing between the variable nozzle vanes 23.

Since the stationary portion P1 and the hub side portion P2 are provided, the leading edge 51 of the variable nozzle vane 23 includes a stationary portion leading edge 51a and a hub side portion leading edge 51b. As illustrated in FIGS. 5A and 6B, the hub side portion leading edge 51b protrudes outward in relation to the stationary portion leading edge 51a. Most of the hub side portion P2 is the concave portion 60 and is recessed (depressed) inward in relation to the outer vane surface 57 of the stationary portion P1 and the hub side portion leading edge 51b protrudes in relation to the stationary portion leading edge 51a. The concave portion 60 and the stationary portion leading edge 51a are connected to each other, but the hub side portion P2 crosses the outer boundary line 57b at the center position thereof.

Further, as illustrated in FIG. 6C, the trailing edge 52 of the variable nozzle vane 23 includes a stationary portion trailing edge 52a and a hub side portion trailing edge 52b. The hub side portion trailing edge 52b slightly deviates with respect to the stationary portion trailing edge 52a. Furthermore, these positions may substantially match each other.

As illustrated in FIGS. 3F, 4A, 4B, and 5A, the concave portion 60 extends in the longitudinal direction of the variable nozzle vane 23 (that is, the longitudinal direction extending from the leading edge 51 to the trailing edge 52). More specifically, the concave portion 60 is formed in a predetermined range at the side of the leading edge 51 in relation to the rotation axis L of at least the variable nozzle vane 23 (see FIG. 6A). More specifically, the concave portion 60 includes a center portion in the longitudinal direction and extends in a region from the center portion to the leading edge 51. Since a pressure at the radial outside S2 tends to increase in the leading edge 51, the above-described pressure reduction effect can be improved when the concave portion 60 is provided at the leading edge 51.

As illustrated in FIG. 6A, the concave portion 60 is formed in a range of 80% or more of the entire length R of the variable nozzle vane 23. The concave portion 60 may be formed in a range of 85% or more of the entire length R of the variable nozzle vane 23. The entire length R corresponds to a chord length of the variable nozzle vane 23.

For example, as illustrated in FIG. 6B, the concave portion 60 includes a start end (that is, a leading end 71) separated from the stationary portion leading edge 51a by 5% or more with respect to the entire length R. That is, a distance of the leading end 71 of the concave portion 60 from the stationary portion leading edge 51a is 5% or more of the entire length R. Further, as illustrated in FIG. 6C, the concave portion 60 includes a terminal end (that is, a trailing end 72) separated from the stationary portion leading edge 51a within 95% with respect to the entire length R. That is, a distance of the trailing end 72 of the concave portion 60 from the stationary portion leading edge 51a is 95% or less of the entire length R. A concave portion length Ra illustrated in FIG. 6A may be a range of 80% or more of the entire length R or may be a range of 85% or more of the entire length R.

More specifically, as illustrated in FIG. 6B, a leading edge center C1b of the hub side portion leading edge 51b is provided so as not to protrude from the shape of the stationary portion P1, that is, the stationary portion leading edge 51a. Further, for example, the leading end 71 is provided at the side of the trailing edge 52 in relation to a peripheral surface extending in a circular-arc shape around a leading edge center C1 on a camber line C while passing through the stationary portion leading edge 51a.

As illustrated in FIG. 6C, a trailing edge center C2b of the hub side portion trailing edge 52b is provided so as not to protrude from the shape of the stationary portion P1, that is, the stationary portion trailing edge 52a. Further, the hub side portion trailing edge 52b is provided so as not to protrude from the stationary portion trailing edge 52a. The trailing end 72 may be provided at the side of the leading edge 51 in relation to a peripheral surface extending in a circular-arc shape around the trailing edge center C2a on the camber line C while passing through the stationary portion trailing edge 52a.

According to the variable nozzle vane 23 and the variable nozzle unit 25 including the variable nozzle vane 23, since the plurality of variable nozzle vanes 23 are rotated in synchronization with the opening direction when the rotation speed of the engine is high and the flow amount of the exhaust gas is high during the operation of the variable displacement type turbocharger 1, the gas flow passage area (the throat area) of the exhaust gas supplied to the turbine impeller 6 increases. As a result, a large amount of the exhaust gas is supplied. Meanwhile, since the plurality of variable nozzle vanes 23 are rotated in synchronization with the closing direction when the rotation speed of the engine is low and the flow amount of the exhaust gas is small, the gas flow passage area (the throat area) of the exhaust gas supplied to the turbine impeller 6 decreases. As a result, since it is possible to increase the flow rate of the exhaust gas, the work amount of the turbine impeller 6 is secured. Accordingly, a rotational force is stably generated by the turbine impeller 6.

As illustrated in FIG. 7, the variable nozzle vane 23 is closer to the shroud wall surface 32*b* in the axial direction D1. The hub side clearance G is formed between the variable nozzle vane 23 and the hub wall surface 31*b*. An exhaust gas flowing from the radial outside S2 becomes a main flow passing between the variable nozzle vane 23 and the variable nozzle vane 23 or a clearance flow leaking from the hub side clearance G in the radial direction D2 and flows into the turbine impeller 6.

In the variable nozzle unit 25, the concave portion 60 is formed at the side of the hub wall surface 31*b* of the outer vane surface 57. A high pressure is formed at the radial outside S2 and a low pressure is formed at the radial inside S1 in the leading edge 51 of the variable nozzle vane 23. Since the concave portion 60 which is recessed from the outer vane surface 57 is provided in a range at the side of the leading edge 51, a pressure can be decreased in the vicinity of the concave portion 60 of the radial outside S2. Accordingly, a difference in pressure between the radial outside S2 and the radial inside S1 decreases. Thus, the hub side clearance flow can be relatively decreased. Then, since the clearance flow decreases, a flow along the main flow can be increased. According to the variable displacement type turbocharger 1 including the variable nozzle unit 25, it is possible to obtain an effect of improving the performance of the turbine 2.

Conventionally, a high pressure is formed at the radial outside of the leading edge of the variable nozzle vane and a low pressure is formed at the radial inside since the flow passage is narrow at that portion. That is, in order to speed up the flow, the pressure is converted to velocity energy and low pressure. Accordingly, since the leakage flow passing through the nozzle side clearance portion increases from the radial outside toward the radial inside, mixing loss to a main flow increases. At the same time, since the impeller inflow angle increases, performance may decrease due to an increase in incidence loss. That is, the flow angle increases due to a decrease in mass flow amount of the main flow. In particular, when the shroud side clearance increases, the leakage flow through the nozzle side may flow into the tip clearance and tip clearance loss may increase.

In the variable nozzle vane 23 of the embodiment, since the concave portion 60 decreases a difference in pressure, the clearance flow decreases. Particularly when the gas flow passage area is narrow, this effect becomes noticeable.

Since the concave portion 60 is provided in most of the entire length R, a difference in pressure between the radial outside S2 and the radial inside S1 decreases in the wider range of the variable nozzle vane 23. Thus, the clearance flow can be further decreased.

A low pressure portion is reliably formed by the inclined surface portion 61 which extends linearly from the boundary line (the outer boundary line 57*b* and the inner boundary line 56*b*) with respect to the stationary portion P1 to the hub end surface 54.

When the concave portion 60 is provided in a too wide range in the span direction, there is a possibility that the function of the outer vane surface 57 is impaired. When the second range provided in the concave portion 60 is 15% or less of the entire height X, it is possible to prevent the function of adjusting the flow passage area of the main flow by the outer vane surface 57 from being impaired while decreasing the clearance flow as described above.

Figure 8:
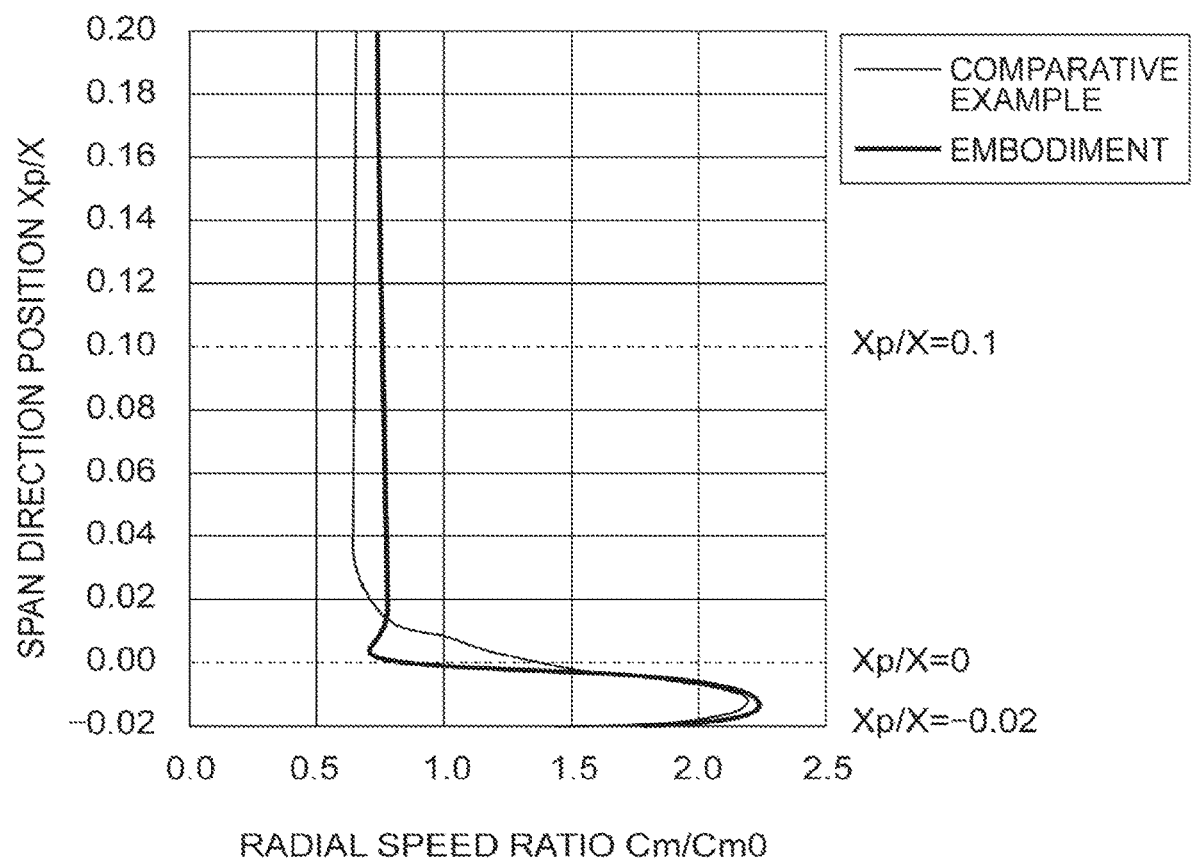
FIG. 8 is a graph showing an example of a radial speed ratio corresponding to a position of a span direction.

Referring to FIG. 8, a distribution of the radial speed ratio Cm in the span direction in the vicinity of the trailing edge 52 of the variable nozzle vane 23 will be described. In the embodiment, the configuration of the variable nozzle vane 23 is adopted. In the comparative example, the conventional variable nozzle vane having a stationary shape and not provided with the concave portion is adopted. As understood from FIG. 8, in the variable nozzle vane 23 of the embodiment indicated by a bold line, the radial speed ratio Cm increases in the main flow (that is, a region larger than Xp/X=0) as compared with the variable nozzle vane of the comparative example. This means that a speed distribution increases in the main flow and a flow amount of the main flow increases. Thus, the improvement of the performance of the turbine 2 is realized. An increase in the radial speed ratio Cm is also found in the stationary portion P1 (that is, a region larger than Xp/X=0.1) as well as the hub side portion P2 (that is, a region smaller than Xp/X=0.1). Furthermore, in a region (that is, a region of Xp/X=0 to −0.02) corresponding to the hub side clearance G, the radial speed ratio Cm is substantially the same.

Although the embodiments of the present disclosure have been described, the present invention is not limited to the above-described embodiments. For example, a range in which the concave portion 60 is provided may be closer to the leading edge 51. The concave portion 60 may be provided in the entire region from the leading edge 51 to the trailing edge 52.

All variable nozzle vanes 23 may not adopt the above-described configuration. A part (one or some) of the plurality of variable nozzle vanes 23 may adopt the above-described configuration of the embodiments.

The present disclosure is not limited to a case in which the variable nozzle vane 23 is axially supported in a cantilevered manner, but may be applied to a case in which the variable nozzle vane is axially supported at both ends thereof. When the variable nozzle vane is axially supported at both ends thereof, the second nozzle ring 32 is also provided with a bearing hole and the rotary shaft provided in the variable nozzle vane 23 is rotatably inserted through the bearing hole.

When the variable nozzle vane 23 is axially supported in a cantilevered manner, a second flow passage wall surface may be formed by the turbine housing 4. That is, the second nozzle ring 32 may be omitted. In this case, the variable nozzle vane 23 is attached to the first nozzle ring 31 and faces the second flow passage wall surface which is a part of the turbine housing 4.

INDUSTRIAL APPLICABILITY

According to some aspects of the present disclosure, since it is possible to relatively decrease the hub side clearance flow, it is possible to increase the flow amount in the main flow.

REFERENCE SIGNS LIST

1: variable displacement type turbocharger, 2: turbine, 3: compressor, 4: turbine housing, 6: turbine impeller, 7: compressor impeller, 14: rotary shaft, 16: scroll flow passage, 21: gas flow passage, 23: variable nozzle vane, 25: variable nozzle unit, 31: first nozzle ring, 31*b*: hub wall surface, 32: second nozzle ring, 32*b*: shroud wall surface, 51: leading edge, 52: trailing edge, 53: shroud end surface, 54: hub end surface, 56: inner vane surface, 57: outer vane surface, 60: concave portion, 61: inclined surface portion, 62: inclined surface portion, C: camber line, H: rotation axis, P1: stationary portion, P2: hub side portion, R: entire length, S1: radial inside, S2: radial outside, X: entire height.

The invention claimed is:

1. A variable nozzle unit used in a turbine including a gas flow passage through which a gas flowing from a scroll flow passage to a turbine impeller passes and a hub wall surface and a shroud wall surface which face each other in a direction of a rotation axis of the turbine impeller and form the gas flow passage, comprising:
a variable nozzle vane which is disposed between the hub wall surface and the shroud wall surface and is rotatable about a rotation axis parallel to the rotation axis of the turbine impeller inside the gas flow passage,
wherein the variable nozzle vane includes a leading edge, a trailing edge, an outer vane surface connecting the leading edge and the trailing edge and facing a radial outside of the rotation axis, and a hub end surface facing the hub wall surface, and
wherein a concave portion at least in a range of the leading edge side in relation to the rotation axis is formed at the hub wall surface side of the outer vane surface, the concave portion communicating with the hub end surface.

2. The variable nozzle unit according to claim 1, wherein the concave portion is formed in a range of 80% or more of an entire length of the variable nozzle vane defined by the leading edge and the trailing edge.

3. The variable nozzle unit according to claim 2, wherein the variable nozzle vane includes a shroud end surface facing the shroud wall surface, and
wherein the outer vane surface includes:
a stationary portion which is formed in a first range at the shroud end surface side of an entire height of the variable nozzle vane defined by the hub end surface and the shroud end surface and has a stationary cross-section perpendicular to the rotation axis, and
an inclined surface portion which is formed in a second range at the hub end surface side of the entire height of the variable nozzle vane while being continuous to the stationary portion through a boundary line and forms the concave portion extending linearly between the boundary line and the hub end surface.

4. The variable nozzle unit according to claim 3, wherein the second range is in a range of 15% or less of the entire height of the variable nozzle vane.

5. A turbocharger comprising:
the variable nozzle unit according to claim 4 provided in the turbine.

6. A turbocharger comprising:
the variable nozzle unit according to claim 3 provided in the turbine.

7. A turbocharger comprising:
the variable nozzle unit according to claim 2 provided in the turbine.

8. The variable nozzle unit according to claim 1,
wherein the variable nozzle vane includes a shroud end surface facing the shroud wall surface, and
wherein the outer vane surface includes:
a stationary portion which is formed in a first range at the shroud end surface side of an entire height of the variable nozzle vane defined by the hub end surface and the shroud end surface and has a stationary cross-section perpendicular to the rotation axis, and
an inclined surface portion which is formed in a second range at the hub end surface side of the entire height of the variable nozzle vane while being continuous to the stationary portion through a boundary line and forms the concave portion extending linearly between the boundary line and the hub end surface.

9. The variable nozzle unit according to claim 8,
wherein the second range is in a range of 15% or less of the entire height of the variable nozzle vane.

10. A turbocharger comprising:
the variable nozzle unit according to claim 9 provided in the turbine.

11. A turbocharger comprising:
the variable nozzle unit according to claim 8 provided in the turbine.

12. The variable nozzle unit according to claim 8,
wherein the leading edge includes a stationary portion leading edge and a hub side portion leading edge that protrudes outward in relation to the stationary portion leading edge, and
wherein the stationary portion leading edge is connected to the concave portion.

13. A turbocharger comprising:
the variable nozzle unit according to claim 1 provided in the turbine.

* * * * *